US010855458B2

(12) United States Patent
Xu

(10) Patent No.: US 10,855,458 B2
(45) Date of Patent: Dec. 1, 2020

(54) SEQUENCE ENCRYPTION METHOD ACCOMPANYING ADJUSTABLE RANDOM RECONFIGURATION OF KEY

(71) Applicants: Zhineng Xu, Nanjing (CN); Yefan Xu, Bukit batok (SG)

(72) Inventor: Zhineng Xu, Nanjing (CN)

(73) Assignees: Zhineng Xu, Nanjing (CN); Yefan Xu, Bukit batok (SG)

( * ) Notice: Subject to any disclaimer, the term of this patent is extended or adjusted under 35 U.S.C. 154(b) by 0 days.

(21) Appl. No.: 16/654,045

(22) Filed: Oct. 16, 2019

(65) Prior Publication Data

US 2020/0195430 A1   Jun. 18, 2020

Related U.S. Application Data

(63) Continuation of application No. PCT/CN2018/082638, filed on Apr. 11, 2018.

(30) Foreign Application Priority Data

Apr. 17, 2017 (CN) .......................... 2017 1 0249427

(51) Int. Cl.
*H04L 9/08* (2006.01)
*H04L 9/06* (2006.01)
*H04L 9/16* (2006.01)

(52) U.S. Cl.
CPC .......... *H04L 9/0869* (2013.01); *H04L 9/0662* (2013.01); *H04L 9/0894* (2013.01); *H04L 9/16* (2013.01)

(58) Field of Classification Search
CPC ... H04L 9/0869; H04L 9/0662; H04L 9/0894; H04L 9/16
See application file for complete search history.

(56) References Cited

U.S. PATENT DOCUMENTS 5,414,771 A * 5/1995 Fawcett, Jr. .......... H04L 9/0662
380/44
5,541,996 A * 7/1996 Ridenour .............. H04L 9/0662
331/78
(Continued)

FOREIGN PATENT DOCUMENTS

CN    103117850 A    5/2013
CN    103560876 A    2/2014
(Continued)

*Primary Examiner* — Shahriar Zarrineh
(74) *Attorney, Agent, or Firm* — Wayne & Ken, LLC; Tony Hom

(57) ABSTRACT

Disclosed is a random binary sequence-based sequence encryption method accompanied with random reconfiguration of a key. The method is mainly characterized in that (1) an existing random sequence is used to dynamically configure a seed random sequence at the beginning of each encryption operation, (2) the seed random sequence is used to pseudo-randomly configure a random key with a fixed-length or variable-length bit field, (3) the pseudo-random configuration of the random key accompanies an encryption process, (4) a transitive property of an exclusive-or operation is used to realize a variable-frequency nonlinear exclusive-or operation on a plaintext using the key, (5) adjustment of key configuration is realized by adjusting a characteristic vector, other operation vectors and a pseudo-random configuration function, such that adjustment of an encryption density can be realized without increasing time complexity, and (6) the characteristic vector are unable to be reversely inducted in polynomial time complexity.

10 Claims, 2 Drawing Sheets

(56) References Cited

U.S. PATENT DOCUMENTS

| | | | | |
|---|---|---|---|---|
| 5,920,627 | A * | 7/1999 | Mionet | H04L 9/083 380/256 |
| 6,430,170 | B1 * | 8/2002 | Saints | G06F 7/588 370/206 |
| 7,170,997 | B2 * | 1/2007 | Petersen | G06F 7/586 380/263 |
| 8,553,880 | B2 * | 10/2013 | Matsumoto | H04L 9/0662 380/46 |
| 9,118,481 | B2 * | 8/2015 | Chiarella | H04L 9/12 |
| 9,465,582 | B1 * | 10/2016 | Whelan | H04W 4/023 |
| 10,348,704 | B2 * | 7/2019 | Figueira | H04L 63/061 |
| 2002/0094085 | A1 * | 7/2002 | Roberts | H04L 9/0869 380/262 |
| 2003/0016821 | A1 * | 1/2003 | Hammersmith | H04L 9/083 380/37 |
| 2003/0016823 | A1 * | 1/2003 | Chung | H04L 9/0662 380/46 |
| 2004/0086117 | A1 * | 5/2004 | Petersen | H04L 9/001 380/44 |
| 2004/0165726 | A1 * | 8/2004 | Yamamichi | H04L 9/085 380/277 |
| 2007/0140482 | A1 * | 6/2007 | Ploog | G06F 21/85 380/44 |
| 2007/0147608 | A1 * | 6/2007 | Mainguet | G06F 7/588 380/46 |
| 2007/0179907 | A1 * | 8/2007 | Waris | G06F 21/575 705/76 |
| 2007/0230694 | A1 * | 10/2007 | Rose | H04L 9/0662 380/46 |
| 2009/0022310 | A1 * | 1/2009 | Robshaw | H04L 9/0662 380/28 |
| 2009/0136030 | A1 * | 5/2009 | Xie | H04N 21/44055 380/210 |
| 2009/0245516 | A1 * | 10/2009 | Ravikiran | H04L 9/0869 380/268 |
| 2012/0027201 | A1 * | 2/2012 | Fujisaki | H04L 9/3073 380/28 |
| 2012/0057704 | A1 * | 3/2012 | Chen | H04W 12/04 380/270 |
| 2013/0083921 | A1 * | 4/2013 | Fujisaki | H04L 9/0847 380/44 |
| 2014/0185808 | A1 * | 7/2014 | Movassaghi | H04L 9/32 380/278 |
| 2014/0270165 | A1 * | 9/2014 | Durand | H04L 9/0869 380/46 |
| 2014/0286487 | A1 * | 9/2014 | Boehl | G09C 1/00 380/28 |
| 2014/0289295 | A1 * | 9/2014 | Lewis | G06F 7/584 708/250 |
| 2014/0321645 | A1 * | 10/2014 | Koo | H04L 9/0838 380/46 |
| 2018/0241548 | A1 * | 8/2018 | Dolev | H04L 9/0656 |
| 2020/0177380 | A1 * | 6/2020 | Prince | H04L 9/0869 |

FOREIGN PATENT DOCUMENTS

| | | |
|---|---|---|
| CN | 104809407 A | 7/2015 |
| WO | 2007092098 A2 | 8/2007 |

* cited by examiner

SEQUENCE ENCRYPTION METHOD ACCOMPANYING ADJUSTABLE RANDOM RECONFIGURATION OF KEY

CROSS-REFERENCE TO RELATED APPLICATIONS

This application is a continuation of International Patent Application No. PCT/CN2018/082638, filed on Apr. 11, 2018, which claims the benefit of priority from Chinese Patent Application No. 201710249427.9, filed on Apr. 17, 2017. The contents of the aforementioned application, including any intervening amendments thereto, are incorporated herein by reference in its entirety.

TECHNICAL FIELD

The invention relates to the field of sequence cryptography in information security cryptography.

BACKGROUND OF THE PRESENT INVENTION

Encryption with the sequence cipher is a process of obtaining a cipher text by bitwise XOR of a pseudo-random sequence generated according to a seed key and a plaintext bit stream using a sequence cipher generator. The sequence cipher encryption method may encrypt plaintext of any length as long as the chaos degree of the generated sequence cipher is large enough. The density of the sequence cipher encryption depends on the randomness of the sequence key generated by the sequence cipher generator. When the probability of acquiring the sequence key is small enough, the probability that the cipher is deciphered is small enough.

Figure 1:
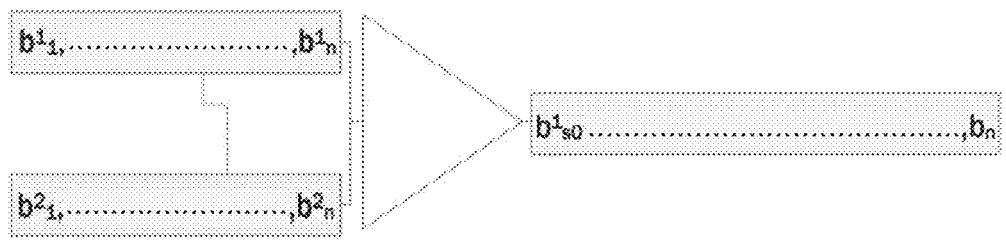
FIG. 1 is a schematic diagram of pseudo-randomly constructing a seed random sequence by forward shifting of two alternate random sequences in accordance with the present invention.
Figure 2:
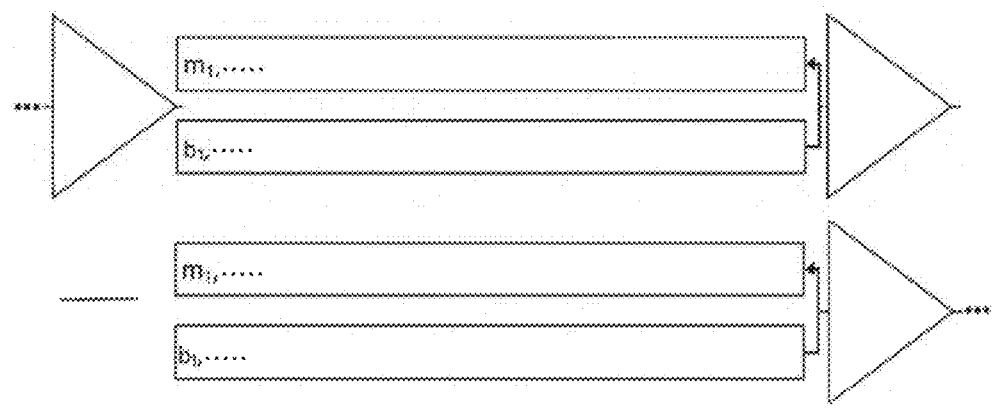
FIG. 2 is a schematic diagram of a staggered random reconstruction state of a key $b_s$ in accordance with the present invention.
Figure 3:
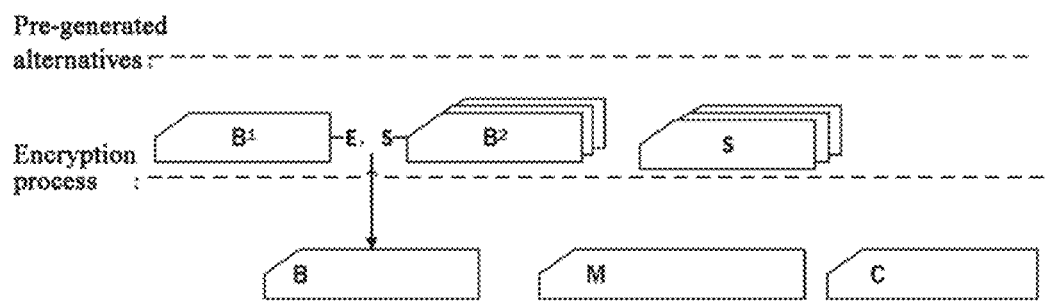
FIG. 3 is a schematic diagram of an encryption process with a pseudo-random reconstruction instance with a single frequency in accordance with the present invention.

They key $b_s$ in FIG. 3 is taken by truncating $b_{j+L}$ bits from B by pseudo-random reconstruction; $m_s$ is taken through forward shifting by $L_s$ length; $c_s$ is generated by XOR for the $m_s$ in forward shifting by $L_s$ length; E is an engine randomly generated for each encryption; and S is a feature number.

SUMMARY

A concept called pseudo-random reconstruction in the present invention is first introduced: a function F has a value domain which covers a random sequence or other determined range and arguments which can comprise a number of random values. A process for obtaining a target random sequence segment by segment, where segment constructed via calculating the start positions of source bit segments, the lengths of source bit segments, and some random value which associated or unassociated with source random sequence, substituting them into the function to obtain a target random bit segment.

The purpose of the present invention is to implement sequence encryption by generating a seed random sequence through pseudo-random construction using a random number called as engine for an existing random number sequence, and in turn, obtaining random key bit segments from the seed random sequence through pseudo-random reconstruction step by step. The pseudo-random reconstruction process is accompanied throughout the encryption process, where in each step, the key bit segment selected by the random number obtained through the pseudo-random reconstruction in the previous step is used for XOR encryption with the plaintext bit segment in the current step. The key bit segments in the steps are combined into an encryption key at current time. Random reconstruction in each step may have a current random bit segment for which a feature number participates in the manipulation of the seed sequence, and the entire reconstruction process presents a chaotic morphology determined by the randomness of the seed sequence manipulated by the feature number. A function sequence is formed by the random number sequence reconstruction function as the encryption process proceeds. The function sequence may be adjusted by the secret rules agreed by the encryption and decryption parties. An instant key sequence obtained by manipulating the random seed sequence using the function sequence presents randomness and concealment, and has the effect of approximate one chaotic codebook per time.

Another important purpose of the present invention is to take advantage of the transitivity of a XOR operation, such that in each XOR step, a multi-frequency XOR is performed by a random number of times determined by the value of the key bit segment in the previous step and the constructed corresponding plurality of key bit segments. This random multi-frequency XOR manipulated by the pseudo-random reconstruction enables the entire encryption process to present random nonlinear morphology with variable frequencies. Further, by a means of pseudo-randomly determining the length of the bit segment in the encryption process, the plaintext bit segment and the key bit segment can be pseudo-randomly extended between frequencies in the multi-frequency XOR, achieving an encryption effect of each bit segment of the cipher text being associated with each other.

The two basic principles described above are further expressed as follows:

Infinite pseudo-random reconstruction is carried out on the finite random sequence to construct an infinite random sequence. Let B be as follows: $b_1, b_2, b_3, \ldots, b_n$ which is an infinite binary random sequence with enough large size. Assuming $b_{n+1}=b_{i1}$, $b_{n+2}=b_{i2}$, ... $b_{2n+1}=b_{j1}$, $b_{2n+2}=b_{j2}$, ...; $i,j<n$. B is pseudo-randomly reconstructed with a random number sequence $L=L_1, L_2, \ldots$ to obtain $\underline{B}=\{b_{i1+1}, b_{i1+2}, b_{i1+3}, \ldots, b_{i1+L1}\}, \{b_{i2+1}, b_{i2+2}, b_{i2+3}, \ldots, b_{i2+L2}\}, \ldots$ where $L_1, L_2, \ldots$ are constructed based on the value of the bit segment of $\underline{B}$ in the previous step. Thus, $\underline{B}$ is an infinite random sequence $\underline{b_1}, \underline{b_2}, \underline{b_3}, \ldots$. This process, called as pseudo-random reconstruction in the present invention, is accompanied in the XOR process of $\underline{B}$ and plaintext to implement chaos of whole bits in the random sequence $\underline{B}$. The run of elements in the random sequence $\underline{B}$ is more chaotic when above $\underline{B}=\{b_{i1,1}, b_{i1,2}, b_{i1,3}, \ldots, b_{i1,L1}\}, \{b_{i2,1}, b_{i2,2}, \ldots, b_{i2,L2}\}, \ldots$ are selected by pseudo-random hopping or no hopping with alternative bit segments $B^j=\{b^j_{i1,1}, b^j_{i1,2}, b^j_{i1,3}, \ldots, b^j_{i1,L1}\}, \{b^j_{i2,1}, b^j_{i2,2}, b^j_{i2,3}, \ldots, b^j_{i2,L2}\}, \ldots$ one or more random sequences and then are each paired orderly to XOR.

When a certain bit segment of plaintext $m_s=\{m_{s1}, m_{s2}, m_{s3}, \ldots, m_{sL}\}$ is multi-XOR with finite $\underline{b}_{s1}=\{b_{i1}, b_{i2}, b_{i3}, \ldots, b_{iL}\}$, $\underline{b}_{s2}=\{b_{j1}, b_{j2}, b_{j3}, \ldots, b_{jL}\}, \ldots, c_s=(m_s \oplus \underline{b}_{s1}) \oplus \underline{b}_{s2}, \ldots$, the plaintext can be recovered by the alike multi-XOR of above result and the keys ($\underline{b}_{s1}, \underline{b}_{s2}, \ldots$), $m_s = (c_s \oplus \underline{b}_{s1}) \oplus \underline{b}_{s2}, \ldots$. When the frequency of the multi-XOR is determined pseudo-randomly by the random value of key bit segment or associated bit segment in the previous step and is randomly distributed in the encryption process, the XOR process for the plaintext presents a nonlinear morphology with variable frequencies.

In order to ensure the concealment and chaos degree of the keys, the present invention provides a method of pseudo-random reconstruction of a seed random sequence B in which a drive random number E privately agreed by the encryption and decryption parties participates. With the method, it makes the encryption key more chaotic and hidden, while the seed random sequences employed in encryption at different times on basis of the same alternate random sequence present randomness variation. The present invention also provides the feature number S specific to each encrypted user to participate in above pseudo-random reconstruction. This makes the seed random sequences of different users on basis of the same alternate random sequence present randomness variation.

The pseudo-random reconstruction method of the present invention is applicable to both the pseudo-random reconstruction process of the seed random sequence B and the pseudo-random reconstruction process of the key $\underline{B}$, and the pseudo-random reconstruction can employ a combination of the following methods (1) through (13) according to the density needs:

(0) defining $B^j = \{b^j_1, b^j_2, \ldots, b^j_n\}$ as an alternative random sequence and $B_i = \{b_{i,1}, b_{i,2}, \ldots, b_{i,n}\}$ as a seed random sequence (i may be omitted when there is only one seed random sequence), $\underline{B} = \{\underline{b}_1, \underline{b}_2, \ldots, \underline{b}_n\}$;

(1) determining a starting bit $b^0_0$ (or $\underline{b}_0$) in an agreed manner (e.g., by an operation participated by the E and/or S) and truncating the target random sequence B (or $\underline{B}$) by forward/backward shifting any source random sequence $B^0$ (or B) by a fixed length;

(2) obtaining the target random sequence B (or $\underline{B}$) by orderly paring segments from more than one source random sequences $B^j$ (or $B_i$) to XOR, where the segments are obtained by forward/backward shifting the source random sequences by the fixed length with the start bit $b^j_k$ (or $b_{i,h}$) determined in the agreed manner (e.g., by an operation participated by the E and/or S) respectively;

(3) obtaining the target random sequence B (or $\underline{B}$) by paring segments from one or more source random sequences $B^j$ (or $B_i$) one by one to multi-frequency XOR, where the segments are obtained by forward/backward shifting the source random sequences by the fixed length with the start bit $b^j_k$ (or $b_{i,h}$) determined in the agreed manner (e.g., by an operation participated by the E and/or S) respectively;

(4) after determining the value $b^{0'}_0$ (or $b'_0$) of the start bit of the segments in the agreed manner, for any source random sequence $B^j$ (or B), performing the following operations according to the value $b^{0'}_{s-1}$ (or $b'_{s-1}$) of the target random bit segment or associated segment (e.g., a corresponding bit segment of the cipher text) in the previous step: ① determining the start bit p of the target bit segment $b^j_s$ (or $b_s$) in the source random sequence in the current step with a positioning function P; ② determining the length l of the source random bit segment $b^0_s$ (or $b_s$) and the target random bit segment $b^0_s$ (or $b_s$) in the current step with a length determining function L; and ③ substituting the position and/or length in above (1) with the start position and/or length of the random source bit segment pseudo-random constructed in ① and/or ② to truncate the target random bit segment;

(5) after determining the value $b^{j'}_0$ (or $b'_{i\ 0}$) of the start bit of the segments in the agreed manner, for more than one source random sequences $B^j$ (or $B_i$), performing the following operations according to the value $b^{j'}_{s-1}$ (or $b'_{i,s-1}$) of the target random bit segment or associated segment in the previous step: ① determining the start bit $b^j_s$ (or $b_{i,s}$) in each of the source random sequences with the positioning function P respectively; ② determining 1 of each of the source random bit segments in the current step with the length determining function L; and ③ substituting the position and/or length in above (1) with the start position and/or length of each of the random source bit segments pseudo-random determined in ① and/or ② to orderly pair each of segments one by one to perform XOR thereby obtaining the target random bit segment $b_s$ (or $_s$);

(6) after determining the value $b^{i'}_0$ (or $b'_{i\ 0}$) of the start bit of the segments in the agreed manner, for more than one source random sequences $B^j$ (or $B_i$), performing the following operations according to the value $b^{j'}_{s-1}$ (or $b'_{i,s-1}$) of the target random bit segment or associated segment in the previous step: ① determining the start bit $b^j_s$ (or $b_{i,s}$) in each of the source random sequences with the positioning function P respectively; ② determining 1 of each of the source random bit segments in the current step with the length determining function L; ③ determining frequency value $f^j$ (or $f_i$) with a frequency determining function F; obtaining the target random bit segment by performing the processes in ④ and ⑤ below: ④ selecting the source random bit segment $b^{j,1}_s, b^{j,1+1}_s, b^{j,1+2}_s, \ldots, b^{j,1+fj}_s$ (or $b^1_{i\ s}, b^{1+1}_{i\ s}, b^{1+2}_{i\ s}, \ldots, b^{1+fi}_{i\ s}$) by the manner of forward shifting each of the source random sequences or the manners in above ① and/or ② substituting those in (1) or (2) to orderly pair each of the segments one by one to perform the multi-frequency XOR, and the result being taken as the target random bit segment $b_s$ (or $\underline{b}_s$); or ⑤ for each of the source sequences, selecting the frequency $f^j$ (or $f_i$) for XOR by ③, and then selecting the source random bit segment $b^{j,1}_s, b^{j,1+1}_s, b^{j,1+2}_s, \ldots, b^{j,1+fj}_s$ (or $b^1_{i\ s}, b^{1+1}_{i\ s}, b^{1+2}_{i\ s}, \ldots, b^{1+fi}_{i\ s}$) by the manner of forward shifting or the manners in above ① and/or ② substituting those in (1) or (2) or (3) to pair each of the segments one by one to perform the multi-frequency XOR (the XOR frequencies for each of $b^j_s$ (or $b_{i,s}$) are different), and the result being taken as the target random bit segment;

(7) a further pseudo-random reconstruction step of enhancing chaos degrees for pseudo-random reconstruction in (4), (5) and (6): constructing a bit hopping function J (whose argument is 1 random values determined by the key bit segment or associated bit segment in the previous step, with the 1 values range being $J(b^{j'}_{s-1})$ or $J(b'_{i,s-1})$, $0 \leq J(b^{j'}_{s-1})$ or $0 \leq J(b'_{i,s-1})$ for selecting the bit segment of the source random sequence in the current step, starting from the source random sequence position p determined by P, according to the hopping function, the bits of the key bit segment in the current step being extracted bit by bit with hopping (when $J(b^{j'}_{s-1})>0$) or without hopping (when $J(b'_{i,s-1})=0$) until the length l of the target bit segment in the current step determined by L is reached;

(8) another enhanced pseudo-random reconstruction to determine the current step source random bit segment $b^j_{s-1}$ or $b_{i,s-1}$ or $b^{j,fj}_{s-1}$ or according to one of the manners in above (4) or (5) or (6) or (7) to, frequency by frequency, select the source random sequence bit segment to perform XOR on the target bit segment one by one;

(9) a further enhanced pseudo-random reconstruction operation for the pseudo-random reconstruction in above (8): in encryption, the target bit segment after XOR per frequency (in decryption, the source bit segment before XOR per frequency) being swapping by the pairing bit determined by the pairing function C according to the random value of the key bit segment or associated bit segment in the previous step;

(10) a further enhanced pseudo-random reconstruction form for the pseudo-random reconstruction in above (8): for each frequency, determining the increase value of the current frequency key bit segment by the extension function A according to the value of the frequency key bit segment or associated bit segment in the previous step, where the source bit segment increases correspondingly with the increase value, and so on to increase the length of bit segment for XOR frequency by frequency; after the operation of the current step is completed, the increase operation part of the target bit segment is backfilled to the corresponding position of the source sequence. (the starting position of the source target bit segment in the next step is still stepped by the target bit segment of the first frequency); as a result, the increased bits have been subjected to several XOR pretreatments before the next XOR, since the pseudo-random reconstruction of these XOR pretreatments in the decryption process is still determined by the value of the same key bit segment or corresponding bit segment, its inverse operation process is an reverse order process; this enhanced form enabling the accompanied pseudo-random reconstruction to present the encryption effect of being associated with each other;

(11) a different form of flexible pseudo-random reconstruction with same principle for the pseudo-random reconstruction in (4), (5), (6), (7), (8), (9), (10): the bit segment determined by P, L, F, J, C and A are changed to be extracted from another random sequence or extracted from a different source random sequence; the effect of constructing the random key in such a random bit still has concealment and chaotic characteristics;

(12) in above (4), (5), (6), (7), (8), (9), (10), the P, L, F, J, C and A functions may add S as an argument to implement a pseudo-random reconstruction with S features, where S may be one or more constants, variables of a function, or a combination thereof (13) the method for obtaining each bit segment of the target sequence can be implemented by combining above pseudo-random reconstruction manners in an agreed manner.

The encryption process of the present invention is carried out as follows:

(S0) preparing basic data (S0.1) pre-generating one or more groups of alternative seed random sequences: $B^1: b^1_1, b^1_2, b^1_2, \ldots, b^1_n; B^2: b^2_1, b^2_2, b^2_3, \ldots, b^2_n; \ldots$ (S0.2) the agreed physical feature quantity S (can be one element, multiple elements, or the integration of multiple elements in a constant set and/or variable set) being used as the feature weight of the encrypted object to participate in the operations of function P, L, F, J, C, and A, where a number of drive engine random numbers E1, E2, . . . that match the alternate random sequences are generated (randomly selected from generated sets) for each encryption, as a trigger element or control elements for the pseudo-random construction (determining the starting state of the pseudo-random construction);

(S0.3) pseudo-randomly-reconstructed seed random sequence $B=\{b_1, b_2, b_3, \ldots, b_s, \ldots, b_n\}$ which may be one or more sequences and can be pseudo-randomly constructed one by one with any of the following methods when more than one seed random sequence is used:

after locating $s_0$ with E, constructing $b_i=b^J_{(S_0+i)\%n}$
$i=1, 2, 3, \ldots, n$ by forward shifting  (1)

or after locating $s_0$ with E, randomly constructing
$b_s=\text{Build}(b^{J'}_{(s-1)})\ s=1, 2, 3, \ldots, n$  (1')

or after locating $s_0$ with E, randomly multi-frequency constructing $b_s=\text{Build}(b^{J''}_{(s-1)})\ s=1, 2, 3, \ldots, n$  (1")

where:

$b^J_{S_0+i)\%n}$ represents one of the pseudo-random constructions in (1), (2), (3), and % n represents continuing from the start after forward shifting to the end of the random sequence;

$\text{Build}(b^{J'}_{(s-1)})$ represents pseudo-randomly constructing the seed random bit segment by arguments of P, L, F, and J obtained by one of (4), (5), (6), (7), (8), (9), (10), and (11) in conjunction with S, $E^{J'}$;

$bs=\text{Build}(b^{J''}_{s-1})$ represents pseudo-randomly multi-frequency constructing the seed random bit segment by arguments of P, L, F, and J obtained by one of (4), (5), (6), (7), (8), (9), (10), and (11) in conjunction with S, $E^{J'}$;

(S1) calculating $L_s$:

(S1.1) when the plaintext stepped to $L_s$ is less than or equal to the remaining plaintext length, $$L_s=L(S, b'_{s-1}),\qquad(2)$$

where L is a function of calculating a new bit segment length, for s=1, taking any $b'_0$ with $L(S, b'_{s-1})$ being not 0 (e.g., $b'_{(E+S)\%n}$);

$b'_s$ represents the random value carried by the bit segment $b_s$ (the same below);

(S1.2) when the plaintext stepped to $L_s$ is greater than the remaining plaintext length, the processing for the last bit segment is performed:

$$L_s=\text{remaining plaintext length}\qquad(3)$$

(S2) calculating $F_s$ $$F_s=F(S, b'_{s-1}),\qquad(4)$$

where F is a function of calculating the XOR frequency of the $S^{th}$ bit segment;

for s=1, same as (S1.1);

(S3) calculating $P_s$ $$P_s=P(S,b'_{s-1}),\qquad(5)$$

where P is a function of calculating the start bit of a new bit segment;

for s=1, same as (S1.1);

(S4) obtaining Fs bit segments from B for multi-frequency repeated XOR $$b^f_s=P(S,b^{f-1}_s)\qquad(6)$$

where P is a function of calculating the start bit of B bit segment for each frequency of the multi-frequency XOR;

$b^f_s$ is the current frequency key bit segment (the same below);

$b^{f_i}_s$ is the random value determined by the current frequency (the same below); for S=1 and f=1, same as (S1.1);

(S5) performing pseudo-random reconstruction to obtain $b_s$:

(S5.1)

$$\underline{b}_s = b^{qs}{}_s(q, p_s, l_s) \text{ where } 0 < q_s < F_s; \quad (7)$$

where $b^{qs}{}_s$ refer to qth new bit segments of B determined by P, L, F, J based on the bit segment calculation unit in the previous step;

or (S5.2)

$$\underline{b}_s = CAL(q_s, b^{qs}{}_s) \quad (7')$$

where $CAL(qs, b^{qs}{}_s)$ represents to reconstruct the bit segment based on $q_s$ and $b^{qs}{}_s$;

(S6) encrypting plaintext bit segment (S6.1) taking the stepping size of $m_s$ same as the stepping size of $b_s$, selecting $m_s = m_{s-1} + L_{s-1}$ by forward shifting, (S6.2) performing multi-frequency XOR in the current step $$c_s = c^1{}_s c^2{}_s \ldots c^k{}_s \ldots c^h{}_s \ldots c^{Fs}{}_s = \ldots (((m_s \oplus \underline{b^1}_s) \oplus \underline{b^2}_s) \oplus \underline{b^3}_s) \ldots \oplus \underline{b^{Fs}}_s \quad (8)$$

(S6.3) swapping the paired bits selected with the pairing function C for $c'_s$ between XORs at each frequency $$c'_s = c'^1{}_s c'^2{}_s \ldots c'^h{}_s \ldots c'^k{}_s \ldots c'^{Fs}{}_s, \text{ which represents the paired bits of pseudo-random in operation at } f^{th} \text{ frequency} \quad (8')$$

(note that 1. (8') merely illustrates an example of swapping paired bits 2. the decryption process for above swapping by pairing is implemented by isomorphic reverse order:

$$c'_s = c'^1{}_s c'^2{}_s \ldots c'^h{}_s \ldots c'^k{}_s \ldots c'^{Fs}{}_s \quad (8'')$$

$$m_s = m^1{}_s m^2{}_s \ldots m^k{}_s \ldots m^h{}_s \ldots m^{Fs}{}_s ( \ldots (c_s \oplus \underline{b^1}_s) \oplus \underline{b^2}_s) \oplus \underline{b^3}_s) \ldots \oplus \underline{b^{Fs}}_s) \quad (8''')$$

(S6.4) calculating for increasing length of bit segments in operation at each frequency (S6.4.1) for (8)/(8'), determining the increase value with the increase function A for $c'_s$ and $b'_s$ between XORs in each of steps, and increasing the bit segment by a subsequent bit of the plaintext, selecting the increased key bit in the same pseudo-random method as before, thereby increasing the XOR frequency by frequency (S6.4.2) truncating bit segment of the current step cipher text in the length determined by $L_s$ (S6.4.3) substituting the increase of the accumulated increased XOR bit segment for the corresponding bit of the original plaintext (S7) stepping $$S = S + 1 \quad (9).$$

DESCRIPTION OF THE INVENTION FEATURES (1) $\underline{B}$ is derived from a pseudo-random reconstruction of different random bit segments of random sequences $B^1$, $B^2$, . . . , and is still a random sequence. Since the elements of the random sequences are independent of each other, the sequence keys obtained by the reconstruction for the random sequences depended on the variations in the position, the length and the frequency of the random elements are a random sequence as well. This target random key $\underline{B}$ depended on the seed random sequence B has concealment.

(2) The generation process of the random secret key is generated in a staggered manner accompanying the encryption process, that is: the position, the length and the next XOR frequency of key in the next step as well as the hopping control in selecting each key bit, the swapping control for target bit segment of each frequency and the increasing control for bit segment between frequencies are determined by the position function, the length determining function, the frequency determining function, the hopping function, the swapping function and the increasing function according to the value of the random number at the position of target sequence or associated position in the previous step, and the pseudo-random reconstruction process is accompanied throughout the encryption process.

(3) A nonlinear mixed morphology of the encryption process is presented based on XOR process with variable frequencies of orderly transitivity of XOR operation.

(4) The logic process of reconstructing the source random seed can be adjusted by the present methods. In particular, the reconstruction function is extended to a functional, and the chaos degree of the random element runs can be increased.

(5) The participation of the engine random number E and the feature quantity S enables each encryption process and each encrypted object having uniqueness. The change in S will improve the application space of the present invention:

(5.1) in the encryption process, P, L, F, J, C and A allow the use of multiple $S = S_1, S_2, S_3, \ldots S_n$ to participate the pseudo-random reconstruction, and the value of bit segment or associated bit segment in the previous step is used to control whether each $S_i$ participates the pseudo-random reconstruction or not;

(5.2) when S is a series of constants $S^j$ or a series of variables generated by a plurality of functions, a plaintext sequence encryption architecture implemented with an exclusive sequence key $\underline{B}^j$ based on the same alternative random sequence $B^J$ is supported.

(6) As one of the application selection, the alternative seed random sequences $B^1$, $B^2$, . . . do not have to be generated during the encryption process (e.g., changed by a secret convention), so that the alternative seed random sequences can be previously stored at parties in the communication together with the manipulation functions P, L, F, J, C, A and S as a secret contract of the encryption and decryption parties. Such a contract can be altered and easy to be maintained.

(7) In practical applications, the plaintext can be prefixed and/or suffixed with a piece of chaotic code to increase the difficulty of cracking.

(8) The pseudo-random reconstruction process in each step has the same computation amount, and the complexity of the whole encryption process is related to n.

(9) Since P, L, F, J, C and A functions use the random value of key bit segment or associated bit segment in the previous step as argument for computing and can randomly use a modulo operation, S is impossible to be back-stepped within the polynomial time complexity (other manipulations that need to be introduced also have this characteristic).

DETAILED DESCRIPTION OF EMBODIMENTS

The invention will be further illustrated by the following examples.

Embodiment 0:

(S0.1) Length n of a random sequence is selected as 2048; one group of alternative random seed sequences are selected: $B^1$: $b^1{}_1$, $b^1{}_2$, $b^1{}_3$, . . . , $b^1{}_n$; for any determined number of engine E1, $P = (E + S) \% 2048$ is used to obtain a start position p of $B^1$. $B^1$ is extracted starting from p by forward shifting and if $b^1{}_n$ is reached the extraction continues from $b^1_0$, thereby obtaining an instant random seed sequence $B=\{b^1_p, b^1_{p1+1}, \ldots, b^1_{p1+2}, b^1_n, b^1_1, \ldots, b^1_{p-1}\}$.

(S0.2) A unit length for calculating of each step is selected as 8 (1 byte), so (1) the corresponding maximum random value is 255; (2) the length of B is 256 bytes and a character array B [256] with 256 elements can be made up.

(S1) It defines $L_s=8$.

(S2) It defines $F_s=1$.

(S3) It calculates stepping amount of a plaintext bit segment as $P(m_s)=P(m_{s-1})+L_{s-1}=P(m_{s-1})+8$, and stepping amount of a key bit segment as $P(\underline{b}_s)=(P(\underline{b}_{s-1})+L_{s-1})\%2048=(P(\underline{b}_{s-1})+8)\%\ 2048$.

(S4) Stepping amount of a bit segment in B is 0 in a multi-frequency repeat XOR (because $F_s=1$).

(S5) $\underline{b}_s=b_s(P_s, L_s, F_s)=b_{s-1}+8$.

(S6) XOR in the current step is performed $c_s=m_s \oplus \underline{b}_s$.

(S7) $S=S+1$.

The decryption process is the same as the encryption process, but only (S6) is changed to (S6'):

(S6') $m_s=c_s \oplus \underline{b}_s$.

Embodiment 0 implements the simplest flow accompanied with pseudo-random reconstruction. Although practical significance is not large, the overall structure of the invention is shown.

EMBODIMENT 1

(S0.1) Length n of a random sequence is selected as 2048; two groups of alternative random seed sequences are selected: $B^1$: $b^1_1, b^1_2, b^1_3, \ldots, b^1_n$; $B^2$: $b^2_1, b^2_2, b^2_3, \ldots, b^2_n$; for any determined number of engines E1, E2, and any determined feature number $SP=(E+S)\%\ 2048$ is used to obtain start positions p1 and p2 of $B^1$ and $B^2$. $B^1$ and $B^2$ are paired to XOR by forward shifting starting from $p_1$ and $p_2$ respectively, thereby obtaining an instant random seed sequence $B=\{b^1_{p1}\Lambda b^2_{p2}, b^1_{(p1+1)\%2048}\Lambda b^2_{(p2+1)\%2048}), \ldots b^1_{(p1+1\ )\%2048}\Lambda^2_{(p1+1)\%2048}\}=\{b_1, b_2, b_3, \ldots\}$.

(S0.2) A unit length for calculating of each step is selected as 8 (1 byte), so (1) the corresponding maximum random value is 255; (2) the length of B is 256 bytes and a character array B [256] with 256 elements can be made up.

(S1) It defines $L_s$.

(S1.1) When the remaining plaintext stepped to is greater than or equal to $L_s$, $L_s=B[P_{s-1}\%\ 256]\%\ 16+1$.

(S1.2) When the remaining plaintext stepped to is shorter than $L_s$, it sets $L_s$=the remaining plaintext length.

(S2) It defines $F_s=B[P_{s-1}/8]\%\ 2+1$.

(S3) Stepping of a plaintext bit segment is $P(m_s)=P(m_{s-1})+L_{s-1}$, and stepping of a key bit segment is $P(\underline{b}_s)=(P(\underline{b}_{s-1})+L_{s-1})\%\ 2048$.

(S4) Stepping of a bit segment in B is 0 in a multi-frequency repeat XOR is $P(\underline{b}^f_s)=(P(\underline{b}^{f-1}_s)+L_s)\%\ 2048$.

(S5) $\underline{b}_s=b_s(P_s, L_s)$ when $F_s=1$; or $\underline{b}^{f(2)}_s=b^{f(2)}_s(P_s, L_s)$ when $F_s=2$.

(S6) XOR in the current step is $C_s=m_s \oplus \underline{b}_s$ when $F_s=1$; or $C_s=(m_s \oplus \underline{b}_s) \oplus \underline{b}^{f(2)}_s$ when $F_s=2$, where the step size of $m_s$ is taken same as that of $\underline{b}_s$.

(S7) $S=S+1$.

The decryption process is the same as the encryption process, but only (S6) is changed to (S6'):

$m_s=c_s \oplus \underline{b}_s$ when $Fs=1$; (S6')

or $C_s=(m_s \oplus \underline{b}_s) \oplus \underline{b}^{f(2)}_s$ when $F_s=2$.

$P(m_s)$, $P(\underline{b}_s)$ and $P(\underline{b}^f_s)$ are the start bits of plaintext bit in the current step, key bit in the current step and key bit at the current frequency, respectively.

% 2048 represents continuing from beginning when the last bit is reached.

Embodiment 1 implements a simple pseudo-random reconstruction process with variable length and variable frequencies by forward shifting.

EMBODIMENT 2

The following changes are made to Embodiment 1.

(S0.1²) Length n of a random sequence is selected as 524288; two groups of alternative random seed sequences are selected: $B^1$: $b^1_1, b^1_2, b^1_3, \ldots, b^1_n$; $B^2$: $b^2_1, b^2_2, b^2_3, \ldots, b^2_n$, for any determined number of engines E1 and E2, $p_1$ and $p_2$ are calculated with P being $p_s(B^i)=(p_{s-1}(B^i)*12345+1103515245+E_i+S)\%\ 524288$; a random seed sequence is calculated as $B=\{b_1, b_2, b_3, \ldots\}=\{b^1_{p1}\Lambda b^2_{p2}, b^1_{(p1+1)\%524288}\Lambda b^2_{(p2+1)\%524288}, \ldots, b^1_{(p1+n)\%524288}\Lambda b^2_{(p2+n)\%524288}\}$.

(S0.2²) A unit length for calculating of each step is selected as 16 (2 bytes), so (1) the corresponding maximum random value is 65535; (2) the length of B is 655356 bytes and a character array B [66536] with 65536 elements can be made up.

(S1.1²) It defines $L_s=B[P_{s-1}\%\ 65536]\%\ 68+64$ when the remaining plaintext stepped to is greater than or equal to $L_s$.

(S1.2²) When the remaining plaintext stepped to is less than $L_s$, it sets $L_s$=the remaining plaintext length.

(S2²) It defines $F_s=(S+B[P_{s-1}\%\ 65536])\%\ 8+16$.

(S3²) The position for B in the embodiment (S3) is changed as $$P(\underline{b}_s)=(B[(P(\underline{b}_{s-1})+S)\%\ 65536]+1103515245)\%\ 524288.$$

(S4²) The position for B in the embodiment (S4) is changed as $$P(\underline{b}^f_s)=(B[(P(\underline{b}^{f-1}_s)+S)\%\ 65536]+1103515245)\%\ 524288,$$

$f=1, 2, \ldots, F_s^-; P(\underline{b}^{f(1)}_s)=P(\underline{b}_s)$.

By above modifications, (1) the XOR frequency of multi-frequency XOR is increased; (2) the chaos degree of selecting cipher bit segment is improved by changing the selection mode for bit segment of the key B from a forward shifting mode to a pseudo-random mode of determining the position based on a value in the previous step; (3) the modulus in (S1.1²) is 68 rather than 64 or 32, which allows the longest length for selecting bit segment to be more than twice of the shortest length.

The embodiment 2 implements the encryption process in which key in the current step is pseudo-randomly reconstructed by the random value of the key bit segment in the previous step.

EMBODIMENT 3

The following changes are made to Embodiment 2.

(S0.4³) A further random sequence $B^T$ is defined with length equal to that of B.

(S2³) It defines $F_s=(S+B[\underline{b}'_{s-1}\%\ 65536])\%\ 8+16$.

(S3³) The positioning for B in the embodiment (S3²) is changed to position for $B^T$:

$$P(\underline{b}^T_s)=(B[(\underline{b}'_{s-1}+S)\%\ 65536]+1103515245)\%\ 524288.$$

($S4^3$) The positioning for B in the embodiment ($S4^2$) is changed as $$P(\underline{b}^{Tf}_s) = (B[(\underline{b}^{f-1}_s + S)\% \ 65536] + 1103515245)\% \ 524288;$$

$$f=1, 2, \ldots, F_s; P(\underline{b}^{T,f(1)}_s) = P(\underline{b}^T_s).$$

By above modifications, the random value obtained from B to perform pseudo-random reconstruction for $B^T$ also allows $\underline{B}$ having concealment and chaotic characteristics.

Embodiment 3 implements the process of scheduling another random sequence from a random value obtained from the previous step to implement a pseudo-random reconstruction for key.

EMBODIMENT 4

The following changes are made to Embodiment 2.

($S0.4^4$) It defines the bit length to which the cipher text C is reached in the current step is $c_s$.

($S1.1^4$) The length of bit segment is modified: $L_s = B[P_{s-1}\%\ 65536]\%\ (c_{s-1}/8)+64$.

By above modifications, an XOR bit segment of $\underline{B}$ is selected by utilizing the progress of the generated cipher text without changing the concealment and chaotic characteristics of $\underline{B}$.

Embodiment 4 implements the process of controlling the pseudo-random reconstruction for key according to the progress of the cipher text sequence.

EMBODIMENT 5

The following changes are made to Embodiment 2.

($S0.2^5$) A unit length for calculating of each step is selected as 20 (2.5 bytes), so the corresponding maximum random value is much greater than 65535; it is modulo 65536, and still distributed in array B [65536] in byte.

($S7^5$) The positioning function for B in ($S3^2$) is selected by the formula $i=(\underline{b}'_{s-1}*S)\%\ 3$ from the following three functions:

$$P[0](\underline{b}_s) = (B[(\underline{b}'_{s-1}+S)\%\ 65536] \oplus (B[c'_{s-1}\%\ 65536]))\%\ 524288;$$

$$P[1](\underline{b}_s) = (B[(\underline{b}'_{s-1}/8] + (S*12347))\%\ 524288;$$

$$P[2](\underline{b}_s) = (B[(\underline{b}'_{s-1}+S+1103515245)\%\ 65536])\%\ 524288;$$

where $c'_{s-1}$ represents the value taken from a cipher text in the previous step in the agreed calculation unit, and the chaos degree of the key element run is further improved.

Note that (1) the decryption algorithm in this embodiment is modified, such that $c'_{s-1}$ is the generated term of the corresponding construction function in encryption while $c'_{s-1}$ is the source item of the corresponding construction function in decryption; (2) the cipher text bit segment is not used to construct the key bit segment, but instead is used to change the run of the key construction.

Embodiment 5 implements a run of ciphertext indirectly scheduling pseudo-random reconstruction for key.

EMBODIMENT 6

The following changes are made to Embodiment 2.

($S0.4^6$) It defines an array S[2]={cell number of a user; a user name;}.

($S0.5^6$) It defines $K=S[\underline{b}_{s-1}\%\ 2]$.

($S2^6$) It defines $F_s=(S[\underline{b}'_{s-1}\%\ 2]+B[P_{s-1}/8])\%\ 8+16$.

($S3^6$) The positioning for B in ($S3^2$) is changed as $$P(\underline{b}_s)=(B[(\underline{b}'_{s-1}+(S[\underline{b}'_{s-1}\%\ 2]))\%\ 65536])\%\ 52428.$$

($S4^6$) The positioning for B in ($S4^2$) is changed as $$P(\underline{b}^f_s)=(B[(\underline{b}^{f-1}_s+(S[\underline{b}'_{s-1}\%\ 2]))\%65536])\%524288,$$
$$f=1,2,\ldots F_s.$$

The chaos degree of the run of positioning and determining frequency is further improved.

Embodiment 6 implements the process of implementing the pseudo-random reconstruction for key from a random value obtained from the previous step and a plurality of feature values.

EMBODIMENT 7

The following changes are made to Embodiment 2.

($S0.1^7$) One group of alternative random seed sequences is added: $B^3$: $b^3_1, b^3_2, b^3_3, \ldots, b^3_{n'}$. Another seed random sequence B2 is generated from $B^2$ and $B^3$ using the same method.

($S0.4^7$) It defines a seed sequence array $B[2]=\{B_1, B_2\}$.

($S0.5^7$) It defines $G=B[\underline{b}_{s-1}]\%\ 2+1$.

($S2^7$) It define $F_s=(S+B_G[P_{s-1}/8])\%\ 8+16$.

The following changes are made to Embodiment 6.

($S3^7$) The positioning for B in ($S3^2$) is changed as $$P(\underline{b}_s)=(B_G[(\underline{b}'_{s-1}+(S[\underline{b}'_{s-1}\%2]))\%65536])\%524288.$$

($S4^7$) The positioning for B in ($S4^2$) is changed as $$P(\underline{b}^f_s)=(B_G[(\underline{b}^{f-1}_s+(S[\underline{b}^{f-1}_s\%2]))\%65536])\%524288.$$

The chaos degree of the run of positioning and determining frequency is further improved.

Embodiment 7 implements the process of pseudo-randomly selecting the seed random sequence reconstructed key in the current step from a plurality of seed random sequences.

EMBODIMENT 8

The following changes are made to Embodiment 2.

($S0.1^8$) One group of alternative random seed sequences is added: $B^3$: $b^3_1, b^3_2, b^3_3, \ldots, b^3_{n'}$. Another seed random sequence B2 is generated from $B^2$ and $B^3$ using the same method.

($S0.4^8$) It defines a seed sequence array $B[2]=\{B_1, B_2\}$.

($S0.5^8$) It defines $G=B[\underline{b}_{s-1}\%\ 2]+1$.

($S2^8$) It define $F_s=(K+B_G[P_{s-1}/8])\%\ 8+16$.

($S3^8$) The positioning for B in ($S3^2$) is changed as $P(\underline{b}_s)=(B_1[\underline{b}'_{s-1}\%\ 65536])\oplus(B_2[\underline{b}'_{s-1}\%\ 65536])$.

($S4^8$) The positioning for B in ($S4^2$) is changed as $P(\underline{b}^f_s)=(B_1[\underline{b}^{f-1}_s\%\ 65536])\oplus(B_2[\underline{b}^{f-1}_s\%\ 65536])$.

The chaos degree of the run of positioning and determining frequency is further improved.

Embodiment 8 implements the process of implementing pseudo-random reconstruction for key using a plurality of seed random sequences at the same time.

EMBODIMENT 9

The following changes are made to Embodiment 2.

($S0.1^9$) One group of alternative random seed sequences is added: $B^3$: $b^3_1, b^3_2, b^3_3, \ldots, b^3_{n'}$. Another seed random sequence $B^2$ is generated from $B^2$ and $B^3$ using the same method.

($S0.4^9$) It defines a seed sequence array $B[2]=\{B_1, B_2\}$.

($S0.5^9$) It defines $G=B[\underline{b}'_{s-1}\%\ 2]$.

($S2^9$) It define $F_s=(B_G[\underline{b}'_{s-1}/8])\%\ 8+8$.

($S3^9$) The positioning for B in ($S3^2$) is changed as positioning for two seeds respectively $P(\underline{b_{1,s}})=B_1[(\underline{b'_{s-1}}+S)\% 65536]$, $P(\underline{b_{2,s}})=B_2[(\underline{b'_{s-1}}+S)\% 65536]$.

($S4^9$) The positioning for B in ($S4^2$) is changed as positioning for two seeds respectively $P(\underline{b^f_{1,s}})=B_1[(\underline{b^{f-1}_s}+S)\% 65536]$, $P(\underline{b^f_{2,s}})=B_2[(\underline{b^{f-1}_s}+S)\% 65536]$;

$$f=0,1,\ldots,F_s.$$

The encryption process is defined as:

($S6^9$) in the current step, $c_s=(\ldots(m_s\oplus\underline{b_{1,s}})\oplus\underline{b_{2,s}}\oplus\underline{b^{f2}_{1,s}}\oplus\underline{b^{f2}_{2,s}})\ldots\oplus\underline{b^{Fs}_{1,s}}\oplus\underline{b^{Fs}_{2,s}})$.

The chaos degree of the run of positioning and determining frequency is further improved.

The decryption process is the same as the encryption process, but only ($S6^9$) is changed to ($S6^{9\prime}$):

$$m_s=(\ldots(c_s\oplus\underline{b_{1,s}})\oplus\underline{b_{2,s}})\oplus\underline{b^{f2}_{1,s}})\oplus\underline{b^{f2}_{2,s}})\ldots\oplus\underline{b^{Fs}_{1,s}}\oplus\underline{b^{Fs}_{2,s}}. \quad (S6^{9\prime})$$

Embodiment 9 implements the process of scheduling multiple seed random sequences from a random value obtained from the previous step to directly perform multi-frequency XOR encryption on plaintext.

EMBODIMENT 10

The following changes are made to Embodiment 9.

($S5^{10}$) It implements key pseudo-random reconstruction with or without hopping.)

($S5.1^{10}$) It defines $J^1=\{j^1_1,j^1_2,\ldots,j^1_L\}$, where $j^1_1$ is the first bit of $B_1[\underline{b'_{s-1}}]$ and the subsequence shifts forward in turn;

$J^2=\{j^2_1,j^2_2,\ldots,j^2_L\}$, where $j^2_1$ is the first bit of $B_2[\underline{b'_{s-1}}]$ and the subsequence shifts forward in turn;

$J^{f,1}=\{j^{f,1}_1,j^{f,1}_2,\ldots,j^{f,1}_L\}$, where $j^{f,1}_1$ is the first bit of $B_1[\underline{b^{f-1}_s}]$ and the subsequence shifts forward in turn;

$J^{f,2}=\{j^{f,2}_1,j^{f,2}_2,\ldots,j^{f,2}_L\}$, where $j^{f,2}_1$ is the first bit of $B_2[\underline{b^{f-1}_s}]$ and the subsequence and the subsequence shifts forward in turn;

$f=1,2,\ldots,F_s$ (note that the argument domain of J is not $B_1[(P(\underline{b_{2,s}})+16)\% 65536]$.)

($S5.2^{10}$)

Each bit is selected from $B_i$ by the following formula according to the element in above array J hopping forward or not hopping to concatenate the key bit segment:

$$b_{i,s}=\prod_{l=1}^{Ls} b_{i,l}>>j_l,$$

$$b^{fs}_{i\,s}=\prod_{l=1}^{Ls} b^{fs}_{i\,l}>>j_l$$

Embodiment 10 implements the selection of a plurality of key segment bits with or without hopping to perform a multi-frequency encryption process on a plaintext bit segment directly.

Embodiment 11: ($S6^9$) in Embodiment 9 is decomposed as following:

($S6.0^{11}$) establishing a pairing function C for determining that the bits to be swapped are $L/2+8$ and $L/2-8$ from the start bit in the multi-frequency;

($S6.1^{11}$) decomposing ($S6^9$) as $F_s$ frequencies:

$$c_1=m_s\oplus\underline{b_{1,s}}; c_2=c_1\oplus\underline{b_{2,s}}; c_3=c_2\oplus\underline{b^{f2}_{1,s}};\ldots; c_{Fs-1}\oplus\underline{b^{Fs}_{2,s}};$$

($S6.2^{11}$) pairing the target bit segment $c_{fs}$ for swapping after XOR of each frequency:

$$c^a_{L/2+8}<->c^a_{L/2-8}.$$

Note that: in the decryption, the above pairing for swapping is performed on the source bit segment (cipher text) prior to XOR in each frequency of ($S6.1^{11}$).

Embodiment 11 implements an encryption process with pseudo-random reconstruction with a pair of bits pairing for swapping, and the swapping by pseudo-randomly bit pairing can be performed multiply times at one frequency, and the number of times can be pseudo-randomly determined as well.

EMBODIMENT 12

($S6.2.0^{12}$) The bit length in ($S6.1^{11}$) in embodiment 11 is extended by increase amount calculated by function A in each frequency $$A_{f,s}=L^{f-1,s}+(S*F_{s+12345})\%3+1$$

($6.2.1^{12}$) For the target of XOR in each frequency, the extended bits of the length of $A_{f,s}$ from a plaintext are concatenated until the plaintext reaches the end (in decryption, the extended bits from cipher text are concatenated)

$$C_f=(c_{f-1}\oplus\underline{b_{2,s}})\|m_{(Lf-1,s+S\%Fs)};\ldots; c_{Fs-1}=(c_{Fs-2}\oplus\underline{b_{1,s}})\|m_{(LFs-1,s+S\%Fs)}$$

$m_{(LFs-1,s+S\%Fs)}$ is the extended bits of the plaintext with length determined by the previous frequency $\underline{b_{1,s}}$ the pseudo-randomly constructed key with the extended bits.

($S6.2.2^{12}$) After XOR (with the extended bits) at each frequency is completed, all bits of the extended portion are backfilled to the corresponding bits of the plaintext to participate in XOR in the next step.

The decryption process is the same as the encryption process, but only ($S6.2^{12}$) is changed to ($S6.2^{12\prime}$):

($S6.2^{12\prime}$) for the target of XOR in each frequency, the extended bits from the cipher text are concatenated until the cipher text reaches the end $$m_f=(m_{f-1}\oplus\underline{b_{2,s}})\|c_{(Lf-1,s+S\%Fs)};\ldots; m_{Fs-1}=(m_{Fs-2}\oplus\underline{b_{1,s}})\|c_{(LFs-1,s+S\%Fs)}.$$

($S6.2.2^{12\prime}$) After XOR (without the extended bits) at each frequency is completed, XOR with extension is performed frequency by frequency in a reverse order by the extended key bits of each frequency in the previous step.

Note that: the source bit segment in the current step has been partially processed by the $S^{th}$ step, that is, the starting portion of the target bit segment in the $S+1^{th}$ step is XORed with both the key in the $S^{th}$ step and the key in the $S+1^{th}$ step. Since each step follows a pseudo-random convention at work, the process does not change in the decryption, and the plaintext can be recovered by the decryption.

Embodiment 12 implements a variation of the length of bit segment in XOR of each frequency. This makes the accompanied pseudo-random reconstruction method presents the encryption effect of being associated with each other.

EMBODIMENT 13

The following changes are made to Embodiment 9.

($S0.1^{13}$) Length n of a random sequence is selected as 524288; two groups of alternative random seed sequences are selected: $B^1: b^1_1, b^1_2, b^1_3, \ldots, b^1_n; B^2: b^2_1, b^2_2, b^2_3, \ldots, b^2_n$; for any determined number of engines E1 and E2, $p_1$ and $p_2$ are calculated with P being $p_i=((p_{i-1}+1)*12345+1103515245+E+S)\% 524288$.

($S0.3^{13}$) It defines $F^j_s = (S + B[P^j_{s-1} \% 65536])\% 8 + 16$.

($S0.4^{13}$) It defines a positioning function for $B_j$ $P(b^j_s) = B[(b^{j}_{s-1} + S)\% 65536]\% 524288$.

($S0.5^{13}$) It defines the length $L_s$ of bit segment of the seed random sequence for pseudo-random reconstruction.

($S0.5.1^{13}$) When the remaining length of the alternative random sequence $B^i$ is greater than or equal to $L_s$, $L_s = B^1[b'_{s-1} \% 65536]\% 16 + 64$.

($S0.5.2^{13}$) When the remaining length of the alternative random sequence $B^i$ is less than $L_s$, it sets $L_s$ = the remaining plaintext length.

($S0.6^{13}$) $b^j_s = b'_s(P^j_s, L^j_s, F^j_s)$.

($S0.7^{13}$) XOR in the current step $b_s = b^1_s \oplus b^2_s$.

($S0.8^{13}$) $S = S+1$.

Then the chaos degree of obtaining the seed random sequence is improved.

Embodiment 13 implements a pseudo-random reconstruction process with a seed random sequence in a manner of non-forward shifting.

The various manipulation functions used in the various embodiments described above all have an adjustable space, and provide sufficient application space for the method accompanied with pseudo-random construction.

What is claimed is:

1. A sequence encryption method accompanied with adjustable randomly-reconstructed key, characterized by sequence encryption/decryption accompanied with reconstructing a random sequence key based on a random binary sequence during encryption/decryption, the method comprising steps of:
   (1) dynamically constructing a seed random sequence $B_i(i=1, 2, \ldots, m)$ at beginning of each encryption/decryption through an existing random sequence, wherein the seed random sequence $B_i(i=1, 2, \ldots, m)$ is derived from a pseudo-random reconstruction of an alternative random sequence $B^j(j=1, 2, \ldots, v)$, or is directly taken from the alternative random sequence $B^j(j=1, 2, \ldots, v)$ if a quantity of the alternative random sequence is more than/equal to a quantity of the seed random sequence;
   wherein the alternative random sequence $B^j(j=1, 2, \ldots, v)$ is a part of a contract of encryption and decryption parties, and the seed random sequence $B_i(i=1, 2, \ldots, m)$ is pseudo-randomly reconstructed or truncated from $B^j(j=1, 2, \ldots, v)$ starting from an agreed position according to an agreement;
   (2) pseudo-randomly constructing a random key B using the seed random sequence $B_i(1 \leq i \leq m)$, wherein the process of constructing the random key B is accompanied with reconstructing a bit segment of a fixed or unfixed length and is processed segment by segment, wherein the generation of the random key B is accompanied during encryption/decryption process and the random key B is generated step by step through pseudo-randomly reconstructing each bit in the seed random sequence $B_i(1 \leq i \leq m)$; and selecting a key bit segment for XOR in each step according the secret agreement of the encryption and decryption parties, wherein the process of selecting comprises obtaining frequencies of XOR of the encrypting/decrypting, a starting position of bit segment in B seed random sequence at each frequency and length of the bit segment, and a process of the pseudo-random reconstruction is determined by the secret agreement;
   (3) encrypting/decrypting a segment of the plaintext by the bit segment of the fixed or unfixed length, wherein each segment of the plaintext XORs with several corresponding key bit segments obtained by the pseudo-random reconstruction with a fixed frequency or variable frequency, an increase or no increase of the bit segment length between frequencies and swapping or not swapping of bits in cipher text segment between frequencies, to generate the cipher text.

2. The sequence encryption method accompanied with adjustable randomly-reconstructed key according to claim 1, characterized by a part of convention in the secret convention being implemented by an agreement construction function which uses following random values as arguments: (1) a random value determined by the key bit segment in previous step according to the secret agreement for the pseudo-random reconstruction, (2) a random values determined by a pseudo-randomly agreed bit segment of other random sequences according to the secret agreement for the pseudo-random reconstruction, or (3) a random value determined by a value of a cipher text bit segment in the previous step according to the secret agreement for the pseudo-random reconstruction.

3. The sequence encryption method accompanied with adjustable randomly-reconstructed key according to claim 1, characterized by:
   (1) forward shifting the bit segment of the plaintext in turn in the process of encryption/decryption for the plaintext segment by segment, wherein the length of the bit segment of the plaintext is equal to the length of the key bit segment, and the length $l_s$ of the key bit segment $b_s$ and the starting position $p_s$ of the key bit segment in the seed random sequence $B_i(1 \leq i \leq m)$ all are determined by the contract agreed by the encryption and decryption parties; a same bit segment of the plaintext is subjected to multi-frequency XOR in turn by a plurality of key bit segments, and the frequency $f_s$ of the multi-frequency XOR is determined by the contract agreed by the encryption and decryption parties;
   (2) except the first frequency, forward or backward shifting the starting position $p^g_s$ of the multi-frequency seed bit segment $b^g_s(g=1,2, \ldots, f_s)$ participating in the multi-frequency XOR according to the position of the multi-frequency seed bit segment $b^{g-1}_s$ in the previous frequency, that is, backward or forward shifting several bits according to the position of the multi-frequency seed bit segment in the previous frequency, wherein the starting position $p^g_s$ of the multi-frequency seed bit segment $b^g_s$ is forward or backward shifted to reach the last bit or first bit of the seed random sequence $B_i(1 \leq i \leq m)$, the forward or backward shifting continues from the last bit or the first bit;
   (3) the length of the multi-frequency seed bit segment $b^g_s$ in the multi-frequency XOR is still equal to $l_s$;
   (4) determining the frequency $f_s$ of the multi-frequency XOR by the contract agreed by the encryption and decryption parties, wherein the pseudo-random reconstruction process of the seed random sequence $B_i(1 \leq i \leq m)$ presents a morphology of forward or backward shifting equidistant from the plaintext when the selected frequency is 1, and the pseudo-random reconstruction process of the seed random sequence $B_i(1 \leq i \leq m)$ presents a morphology of forward or backward shifting with hopping in times of distance from the plaintext when the selected frequency is greater than 1;
   (5) encrypting the bit segment of the plaintext with XOR at the fixed frequency step by step using the multi-frequency seed bit segment $b_s$ obtained above.

4. The sequence encryption method accompanied with adjustable randomly-reconstructed key according to claim 1, characterized by improving encryption density by following steps:
   (1) determining the unit for calculating by the agreed starting position and agreed length of the key bit segment $b_{s-1}$ in the previous step;
   (2) determining the starting position $p_s$ of a reconstruction source $b_{i,s}(1<=i<=m)$ of the key bit segment $b_s$ of the random key B in the current step by a random value taken in the unit for calculating of the key $b_{s-1}$ or an associated bit segment of the random key B in the previous step and a feature quantity S through a positioning function P, wherein P is any function whose value domain covers the whole seed random sequence $B_i(1<=i<=m)$, that is, the value domain $P(b_s)$ of P satisfies $0<P(b_s)<n$, and n is the maximum position of element in the seed random sequence $B_i(1<=i<=m)$;
   (3) determining the length $1_s$ of the key bit segment $b_s$ of the random key B and the reconstruction source $b_{i,s}$ $(1<=i<=m)$ in the current step by the random value taken in the unit for calculating of the key bit segment $b_{s-1}$ or an associated bit segment of the random key B in the previous step and the feature quantity S through a length determining function L, wherein L is any function whose value domain is greater than 0, that is, the value domain $L(b_s)$ of L satisfies $0<L(b_s)<n$, and n is the maximum position of element in the seed random sequence $B_i(1<=i<=m)$;
   (4) determining the frequency $f_s$ of XOR for the bit segment $m_s$ of the plaintext with the random key bit segment $b_s$ by the random value taken in the unit for calculating of the key bit segment $b_{s-1}$ or an associated bit segment of the random key B in the previous frequency and the feature quantity S through a frequency determining function F, wherein F is any function whose value domain is greater than 0;
   (5) determining the key bit segment $b_s$ in the seed random sequence $B_i(1<=i<=m)$ by $p_s$ and/or $1_s$ selected by the steps (2) and (3), determining the frequency $f_s$ of XOR in the current step by the step (4), selecting $f_s$ bit segments $b^1_s$, $b^2_s$, . . . , $b^{f_s}_s$ from the seed random sequence $B_i(1<=i<=m)$ in a manner of forward shifting or a pseudo random manner, and performing the multi-frequency XOR $f_s$ times orderly for the bit segment $m_s$ of the plaintext in the current step with the above selected key bit segments.

5. The sequence encryption method accompanied with adjustable randomly-reconstructed key according to claim 1, characterized by further improving encryption density by following steps:
   (1) pseudo-randomly constructing the random key B with a plurality of seed random sequences $B_i(i=1,2,3,...,m;$ m is any positive integer), wherein the constructing comprises: (a) pseudo-randomly selecting or constructing a plurality of seed bit segments $b_{i,s}(i=1, 2, 3, . . . , m, b_{i,s}$ is a seed bit segment selected in the s-th step from the i-th seed random sequence $B_i$) according to the value of the key bit segment $b_{s-1}$ or the associated bit segment in the previous step in the agreed contract, performing orderly paired XOR for the seed bit segments one by one and taking a result as the key bit segment $b_s$ in the current step; (b) pseudo-randomly selecting one of $(0<i<=m)$ as the key bit segment $b^q_s(q=1,2,..., f_s)$ in the current step according to the value of the key bit segment $b_{s-1}$ or the associated bit segment in the previous step in the agreed contract; or
   (c) pseudo-randomly selecting part of $b_{i,s}(i=1, 2, 3, . . . , j; j<=m)$ in the current step according to the value of the key bit segment $b_{s-1}$ i or the associated bit segment in the previous step in the agreed contract, one by one to XOR and performing the result as the key bit segment $b^q_s(q=1,2, . . . , f_s)$;
   (Note: $b_{i,s}$ in (b) and (c) refers to m bit segments them picking up from $B_i$, in the sth step)
   (2) performing f-frequency ordered XOR on the bit segment $m_s$ of the plaintext through the key bit segment $b^q_s(q=1,2, . . . , f_s)$ constructed by above (1).(b) or (1).(c); or
   (3) directly using various bit segments $b_{i,s}(i=1, 2, 3, . . . , m)$ selected by above (1).(a) as $f_s$ frequency key bit segments $b_{g,s}(1, 2, . . . , f_s)$, or constructing frequency seed bit segments $b^g_s(1, 2, . . . , f_s; i=1, 2, . . . , m; b^g_{i,s}$ is the g-th frequency seed bit segment selected in s-th step in respective seed random sequence $b_i$) in a pseudo random manner one by one by any of above function P and function L and constructing frequency key bit segment $b^q_s$ with m frequency seed bit segments $b^q_{i,s}$ in each frequency, and then performing the multi-frequency XOR for $f_s$ times on the bit segment $m_s$ of the plaintext one by one or in a mixing way;
wherein $b^q_s(q=1,2, . . . , f_s)$ in (2) refers to $f_s$ bit segments constructed from $B_i$ in the sth step;
$b^q_s(q=1,2, . . . , f_s)$ in (3) refers to $m*f_s$ bit segments constructed from $B_i$, in the sth step.

6. The sequence encryption method accompanied with adjustable randomly-reconstructed key according to claim 1, characterized by further improving encryption density by following steps:
   (1) constructing a bit hopping function J for selecting the key bit segment in the current step; or
   (2) in obtaining seed bit segment $b_{i,s}$ $(i=1, 2, . . . , m)$ and/or frequency seed bit segment $b^q_{i,s}(q=1,2, . . . ,f_s)$, extracting or reconstructing each bit of each key bit segment in the current step or at the current frequency bit by bit starting from a source random sequence position determined by $p_s$ with pseudo-randomly hopping according to the bit hopping function J, until reaching the length 1;
   (3) performing the multi-frequency ordered XOR for the bit segment $m_s$ of the plaintext after constructing key bit segment in a pseudo random manner with the seed bit segment $b_{i,s}(i=1, 2, . . . ,m)$ and/or frequency seed bit segment $b^g_{i,s}(q=1, 2, . . . , f_s)$.

7. The sequence encryption method accompanied with adjustable randomly-reconstructed key according to claim 1, characterized by adding a step of pairing bits of the target bit segment between frequencies of the multi-frequency XOR to swap according to a pseudo-random secret agreement in the process of multi-frequency XOR to further improve the encryption density:
   (1) constructing a bit pairing function C for selecting the target bit segment in the current step;
   (2) performing swapping for the target bit segment of each frequency with the selected paired bits during encrypting in the manner of above 5.(2) or 5.(3); and
   (3) performing swapping for the cipher text bit segment with the selected paired bits during decrypting for the encrypted cipher text in above 5.(2) or 5.(3).

8. The sequence encryption method accompanied with adjustable randomly-reconstructed key according to claim 1, characterized by adding a step of increasing the length of bit segment for XOR per frequency according to the contract agreed in the process of multi-frequency XOR to further improve the encryption density:

(1) constructing a length extension function A for the bit segment between frequencies in the current step;

(2) extending the plaintext bit segment and the key bit segment by a determined increase value frequency by frequency during encrypting in the manner of above 5.(2) or 5.(3); and (3) extending the cipher text bit segment and the key bit segment by the determined increase value frequency by frequency during decrypting in the manner of above 5.(2) or 5.(3);

(4) after calculating at each frequency, backfilling the increased bits to the corresponding positions of the source sequence.

9. The sequence encryption method accompanied with adjustable randomly-reconstructed key according to claim 1, characterized by adding alternative random sequences in implementing pseudo-randomly constructing the seed random sequence to improve a chaos degree of the seed random sequence B:

(1) pre-generating more than one alternative random sequence $B^j(j=1, 2, \ldots, m)$ for constructing the seed random sequence $B_i(1<=i<=m)$, establishing a positioning function $P_0$ and the feature quantity S by using an instant random number $E^j(j=1, 2, \ldots, m)$ called as engine the number of which matches $B^j(j=1, 2, \ldots, m)$, and after the multi-alternate random sequence starting position $p^i_0(j=1, 2, \ldots, m)$ of each $B^j$ $(j=1, 2, \ldots, m)$ is determined by $P^j_0$ driven with $E^j$ and S, obtaining multiple alternate random segments $b^j_{i,s}(1<=i<=m; j=1, 2, \ldots, m)$ by each alternate random sequence $B^j(j=1, 2, \ldots, m)$, and then obtaining the seed segment bs by performing orderly paired XOR on the obtained m Multi-alternate random segments $b^j_{i,s}(1<=i<=M; j=1, 2, \ldots, m)$, wherein in the process of XOR, it continues with the bit of any $B^j$ from the starting of $B^j$ when the last bit of the $B^j$ is reached, until reaching a desired length of the seed bit segment $b_{i,s}(1<=i<=m)$;

(2) determining the corresponding bit segment of the seed random sequence $B_i$ $(1<=i<=m)$ from the bit segment $b_{s-1}$ of the previous step by substituting functions P, L, F, J, C and A for corresponding functions for generating a pseudo-random reconstruction element in (1), constructing the seed random sequence $B_i(1<=i<=m)$ segment by segment with the manner in (1), and changing the length of the generated seed random sequence B as desired;

(3) for a plurality of seed random sequences $B_i(i=1, 2, \ldots, m)$, repeating the above steps (1) and (2) to obtain different seed random sequences $B_i(i=1, 2, \ldots, m)$.

10. The sequence encryption method accompanied with adjustable randomly-reconstructed key according to claim 1, characterized by: the feature quantity S participating in the pseudo-random reconstruction being a constant or a variable of a function, a plurality of constants or variables of the function or an integration of the plurality of constants or variables of the function:

(1) in the encryption process, P function, L function, F function, J function, C function and A function all allowing to use a plurality of $S=S_1, S_2, S_3, \ldots, S_m$ participate in the pseudo-random reconstruction, and pseudo-randomly determining whether each $S_i$ is allowed to participate in the pseudo-random reconstruction by a manipulation function K randomly selecting k $S_i(i=1, 2, \ldots, m)$ from the m $S_i$ to participate in calculating, $k \leq m$;

(2) when S is a plurality of groups of feature quantities $S^r$(r is a positive integer) for the pseudo-random reconstruction, supporting the sequence encryption/decryption for j series of plaintext based on r pairs of paired exclusive sequence keys $B^g(g=1, 2, \ldots, r)$ of the common seed random sequence $B_i(i=1, 2, \ldots, m)$, and when S is a plurality of groups of variables generated by a plurality of functions, supporting a plaintext sequence encryption/decryption architecture implemented based on multi-party paired exclusive sequence keys $B^q(q=1, 2, \ldots, r)$ of the common seed random sequence $B_i(i=1,2,3, \ldots, m)$.

* * * * *